(12) United States Patent
Barozzi

(10) Patent No.: US 9,346,133 B2
(45) Date of Patent: May 24, 2016

(54) APPARATUS FOR WELDING CONTINUOUS STRIPS WOUND ON A SUPPORT RING

(75) Inventor: Gian Piero Barozzi, Crema (IT)

(73) Assignee: GSKET S.r.l., Crema (IT)

( * ) Notice: Subject to any disclaimer, the term of this patent is extended or adjusted under 35 U.S.C. 154(b) by 762 days.

(21) Appl. No.: 13/566,507

(22) Filed: Aug. 3, 2012

(65) Prior Publication Data

US 2013/0032579 A1 Feb. 7, 2013

(30) Foreign Application Priority Data

Aug. 5, 2011 (IT) ............................. MI2011A1497

(51) Int. Cl.
| | |
|---|---|
| *B23K 11/06* | (2006.01) |
| *B23P 15/00* | (2006.01) |
| *B23K 11/16* | (2006.01) |
| *B23K 11/30* | (2006.01) |

(52) U.S. Cl.
CPC .............. *B23P 15/00* (2013.01); *B23K 11/061* (2013.01); *B23K 11/16* (2013.01); *B23K 11/3036* (2013.01); *B23K 2201/04* (2013.01); *B23K 2201/16* (2013.01)

(58) Field of Classification Search
CPC .. B23K 11/061; B23K 11/16; B23K 11/3036; B23K 2201/04; B23K 2201/16
USPC .......................................... 219/67, 81, 83, 84
See application file for complete search history.

(56) References Cited

U.S. PATENT DOCUMENTS

| | | | | | |
|---|---|---|---|---|---|
| 2,475,856 | A | * | 7/1949 | Price ................................ | 72/148 |
| 2,879,490 | A | * | 3/1959 | Campbell et al. ................ | 219/84 |
| 2,892,921 | A | * | 6/1959 | Mecklenborg ................... | 219/81 |
| 3,132,234 | A | * | 5/1964 | Wogerbauer ..................... | 219/67 |
| 3,484,576 | A | * | 12/1969 | Foster et al. ..................... | 219/81 |

FOREIGN PATENT DOCUMENTS

| | | | |
|---|---|---|---|
| EP | 707906 A1 | * | 4/1996 |
| JP | 8-226544 A | * | 9/1996 |

OTHER PUBLICATIONS

Machine translation of Japan Patent document No. 8-226,544, Aug. 2015.*

* cited by examiner

*Primary Examiner* — Geoffrey S Evans

(74) *Attorney, Agent, or Firm* — Mintz Levin Cohn Ferris Glovsky and Popeo, P.C.

(57) ABSTRACT

Apparatus for welding continuous strips (1a,1b) wound on a support ring (113), comprising at least means (2) for feeding the strips (1a,1b) to be wound on the support ring (113), an assembly (100) for winding said strips, an assembly (200) for applying radial pressure onto the strips, comprising a first circular jaw (211) and a second circular jaw (212), which are arranged opposite each other and spaced in the longitudinal direction (X-X) by an amount corresponding to the width of the finished seal, and an assembly (300) for welding one (1a) of said strips (1a,1b), said pressing assembly (200) and said welding assembly (300) being coaxial, wherein said welding assembly (300) comprises a first electrode (310) and a second electrode (320) which are arranged inside the jaws (211,212) of the pressing assembly so as to face each other and have a diameter smaller than that of the said jaws (211,212).

8 Claims, 3 Drawing Sheets

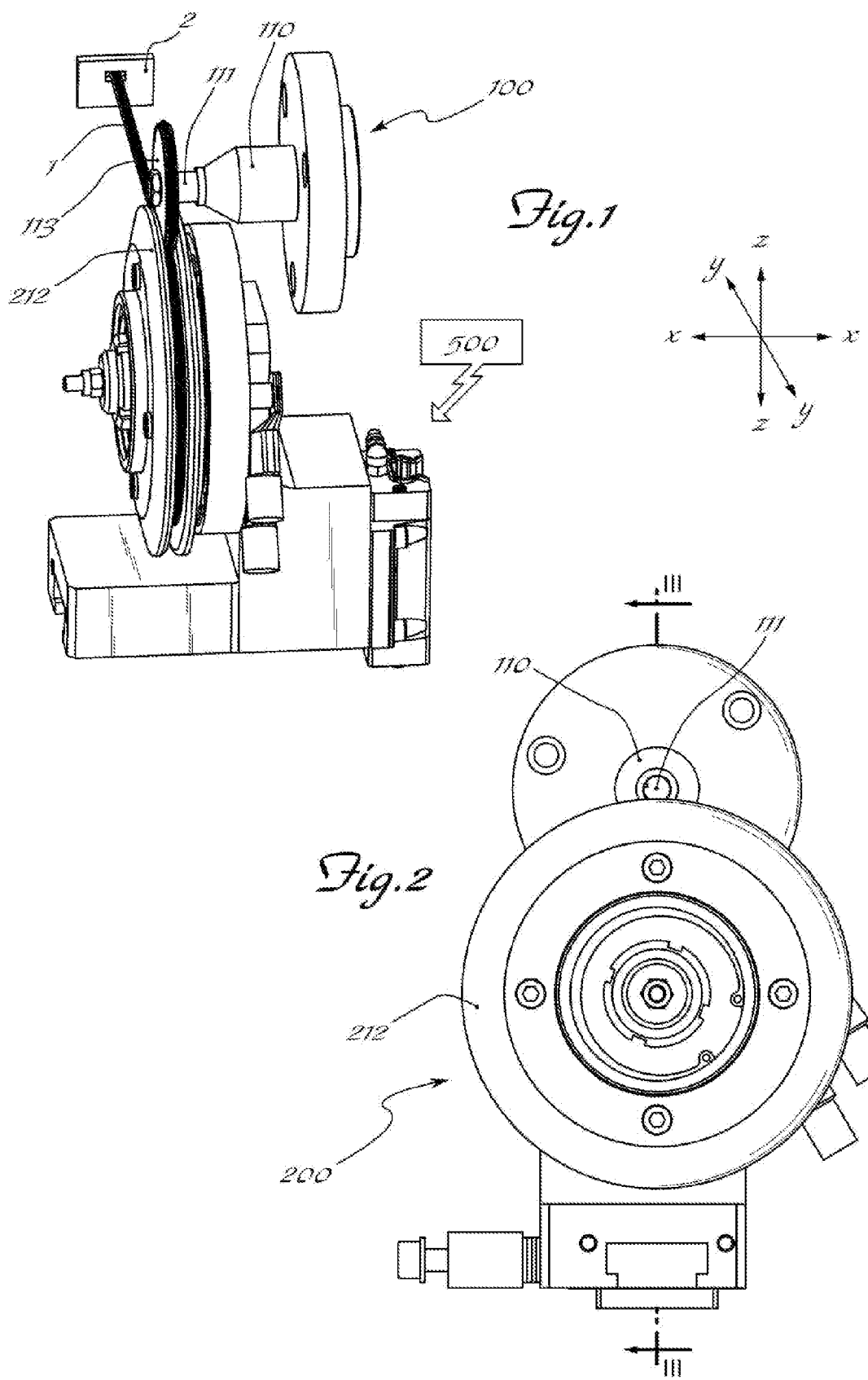

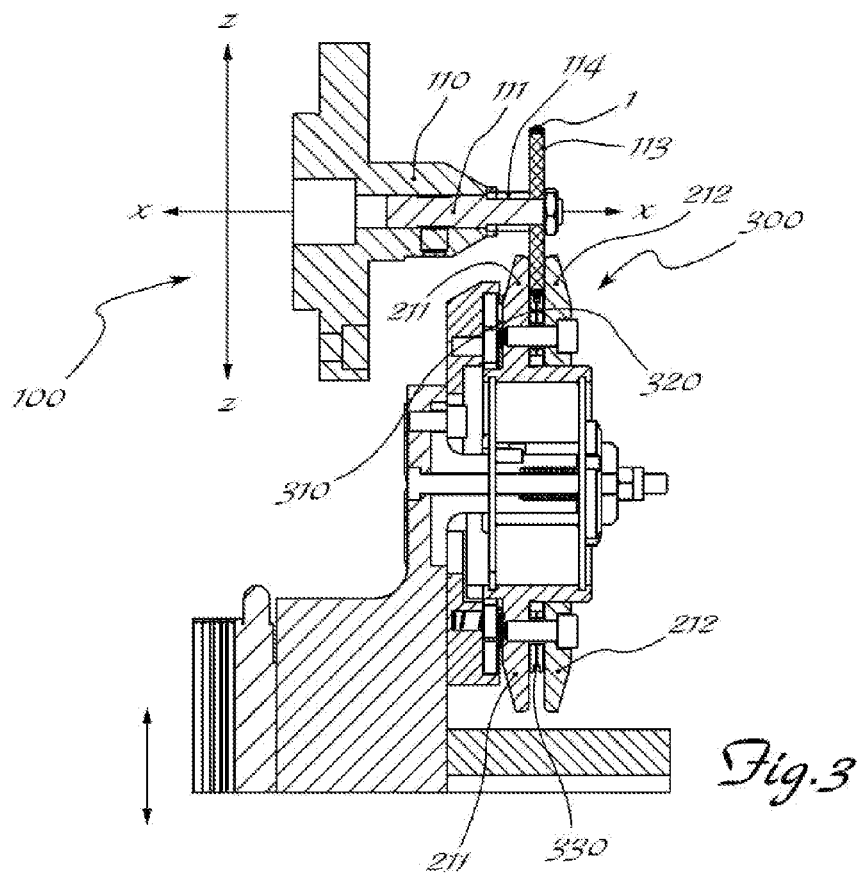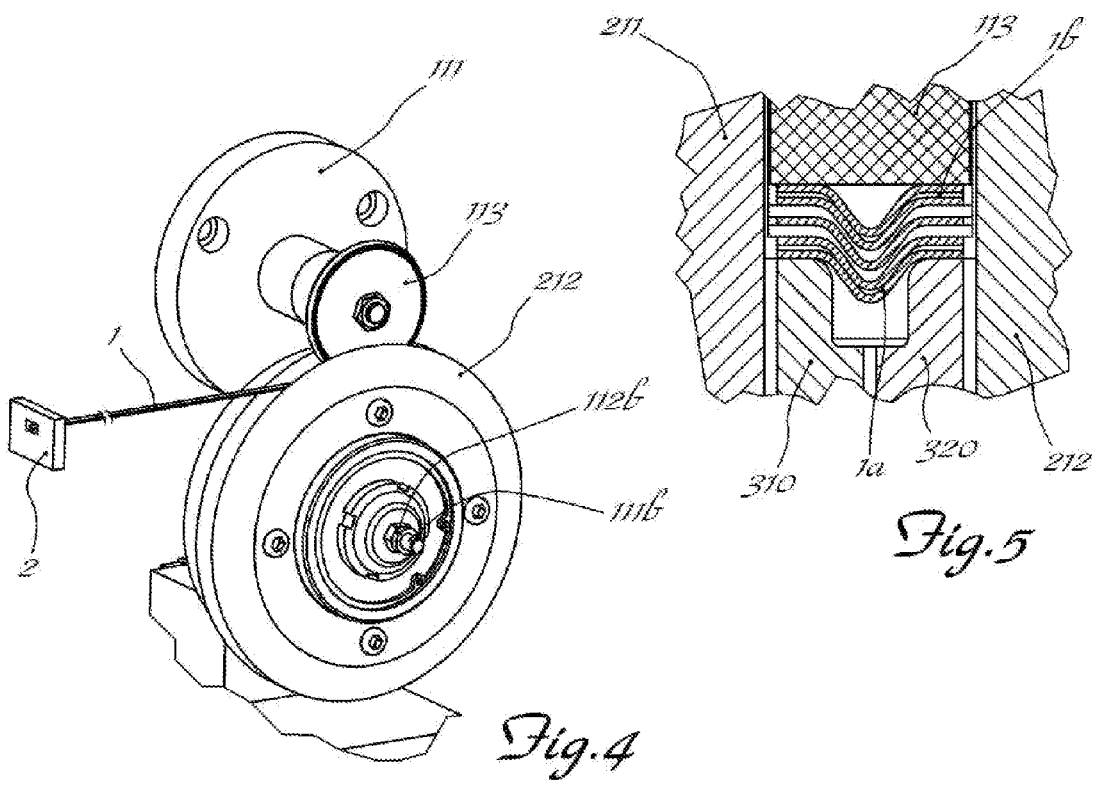

APPARATUS FOR WELDING CONTINUOUS STRIPS WOUND ON A SUPPORT RING

RELATED APPLICATIONS

This application claims priority to Italian Patent Application No. MI2011A1497 filed on Aug. 5, 2011, the content of which is hereby incorporated by reference.

TECHNICAL FIELD

The present invention relates to an apparatus for welding strips wound on a support ring, comprising a pressing assembly and a welding assembly arranged in the same circumferential area and acting simultaneously in the radial direction on the said strips.

BACKGROUND

Numerous types of seals are known in the art. Seals can be made in the form of rings and can provide a static frontal sealing action. Seals can be used, for example, for connecting pipes. Seals can be produced by winding two spiral strips superimposed on each other and with different physical and mechanical properties. Typically, the first strip has a high mechanical strength, for example a strip made of steel, and provides support for a second strip made of a material with optimal insulating and sealing properties. Machines exist which form seals by means of a semi-manual operation, which requires constant monitoring by an operator, or automatically. EP 0,707,906 describes an automatic machine for the production of seals. Strips with different physical and mechanical properties are spirally wound onto a support ring. The described machine comprises means for feeding said support rings to a mandrel; means for feeding the strips to be wound to the support ring; an assembly for applying radial pressure onto said rings; and an assembly for welding one of said strips for starting winding and for closing the seal once winding has been completed.

These machines have a number of drawbacks because they do not have means for retaining the seal in the direction perpendicular to its axis of rotation, resulting in a lack of planarity of the finished seal. This causes defects in the final welds. The defects are worsened by the fact that welding is performed by an assembly in a circumferential position of the spiral distant from the position of the pressing assembly in the radial direction of the spiral itself.

GB 2,258,018 also describes a machine for producing seals in which a welding assembly is separate from the pressing assembly and the welding assembly is operated to move towards the seal in a direction perpendicular to the operating direction of the pressing assembly. The double device involves an increase in the dimensions, power supply means and control means for the synchronized operation of the two assemblies. Additionally, defects arise since welding is performed in a zone different from the pressing zone.

JP 8-226544 describes a conventional welding assembly, which acts on the metal strip at the start and at the end of winding; however, does not describe the position and interaction of the pressing assembly.

In each of the above-mentioned cases, performing welding in a position different from that of the pressing assembly, the steel strip tends to react elastically, since it is free along the section between the pressing point and the welding point, causing a loss of compactness of the seal in the radial direction.

SUMMARY

An apparatus and a machine is described comprising an apparatus that provides a solution to the abovementioned problems of the prior art. The current subject matter also has small dimensions, so that it is possible to reduce the overall dimensions of the machines. The current subject matter is easy and inexpensive to produce and assemble and can be installed easily on machines which are already produced.

These results are obtained according to the present invention by an apparatus and machine for welding strips, with different properties, wound onto a support ring.

DESCRIPTION OF DRAWINGS

Further details may be obtained from the following description of a non-limiting example of embodiment of the subject of the present invention provided with reference to the accompanying drawings in which:

FIG. 1: shows a lateral perspective view of an example of embodiment of the apparatus according to the present invention;

FIG. 2: shows a front view of the apparatus of FIG. 1;

FIG. 3: shows a partial schematic cross-section along the plane indicated by III-III in FIG. 2;

FIG. 4: shows a perspective view of the apparatus during winding of the strips;

FIG. 5: shows a partial schematic cross-section of the seal being wound onto the support ring;

DETAILED DESCRIPTION

Directional terms are used for convenience herein such as "X-X direction," "Y-Y direction," and "Z-Z direction" in reference to the drawings and description; however, elements of the current subject matter can be implemented in many orientations and these terms are not intended to be limiting and absolute.

FIG. 1 illustrates a lateral perspective view of an example embodiment of an apparatus in accordance with the current subject matter. A set of three reference axes are used herein. A longitudinal direction X-X, corresponding to an axis of rotation of a seal, vertical direction Z-Z perpendicular to the longitudinal direction and corresponding to a direction of movement of a pressing and a welding assembly towards/away from the seal, and a radial direction Y-Y, perpendicular to the two other directions.

Figure 6:
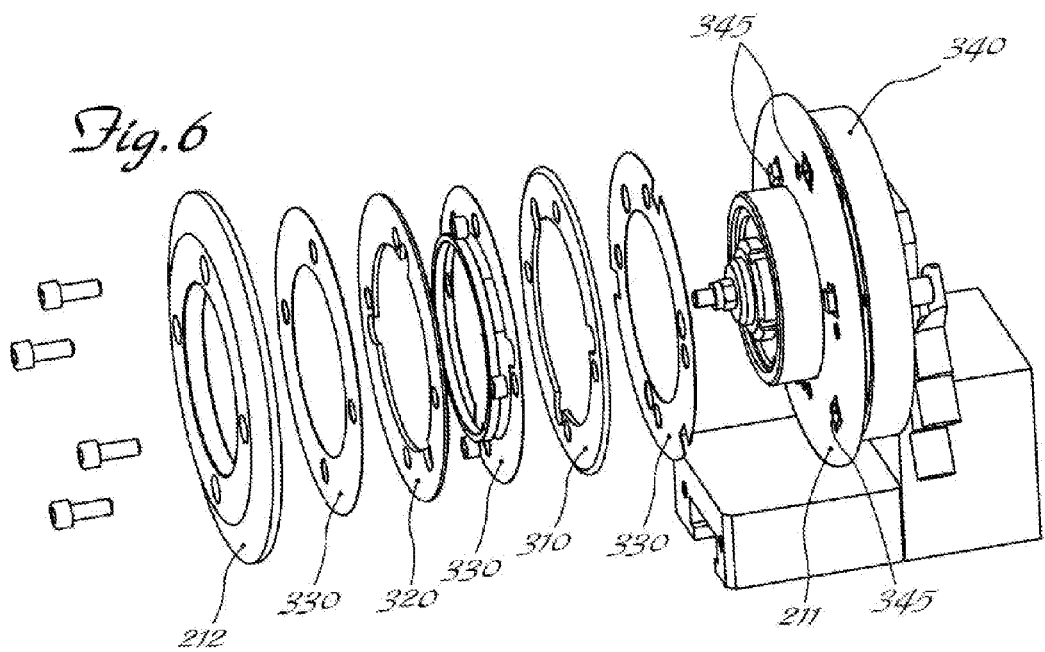
FIG. 6: shows an exploded view of the welding assembly.
Figure 7:
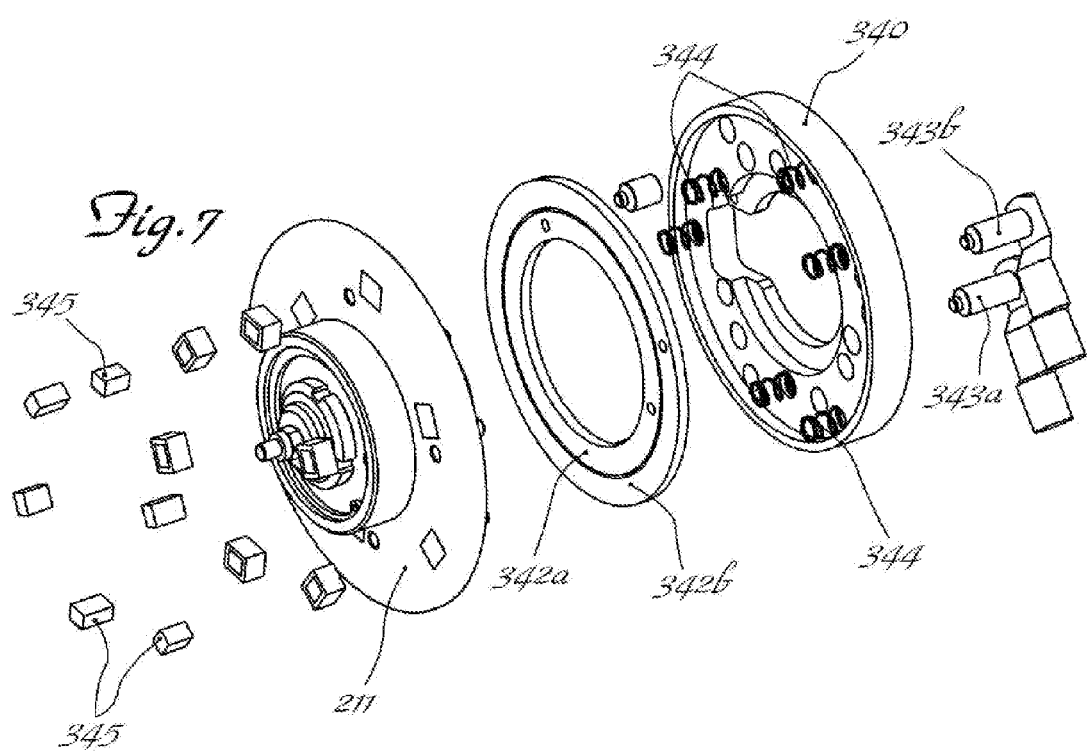
FIG. 7: shows an exploded view of the assembly for energizing the welding assembly.

FIGS. 1 to 7 show an assembly 100 for winding the strips 1, specifically a strip 1a made of material such as steel, with optimum mechanical properties, and a strip 1b with optimum sealing properties, supplied by feeders 2 (not described in detail). The assembly 100 includes a mandrel 110 which rotates about the longitudinal axis X-X and which has, inserted inside it, a pin 111 supporting a ring 113. The ring 113 has a suitable internal and external diameter, onto which the seal can be wound and is further housed inside an annular seat of the pin 111. The ring 113 locks in position in the longitudinal direction X-X by means of a locking nut 112b suitable for mating with a corresponding end thread 111b of the pin 111. In the case of a strip with a smaller width in the longitudinal direction X-X, shown in the figures, the ring 113 can have a corresponding reduced thickness and can be kept locked on the mandrel by means of spacers 114. The spacers 114 have a variable thickness depending on the width of the strips to be wound.

FIGS. 1 to 7 show a pressing assembly 200 for pressing in the radial direction Y-Y and containing in the axial direction X-X the strips 1 being wound. The second assembly 200 includes a first circular jaw 211 and a second circular jaw 212, which are situated opposite each other. The first jaw 211 can be axially fixed to the body of the apparatus, while the second jaw 212 can be displaced in the longitudinal direction X-X with respect to the first jaw in order to vary the relative distance depending on the width, in the longitudinal direction, of the strips 1 to be wound. The pressing assembly 200 can also include a means (not shown) for pushing the pressing assembly 200 along the vertical direction Z-Z and a recall means, such as a cylinder or the like (not shown) for operating the pressing assembly 200 in the opposite direction to the pushing direction.

FIGS. 1 to 7 show a welding assembly 300 coaxially arranged between the two circular jaws 211 and 212 and including a first electrode 310 and a second electrode 320. The first electrode 310 and second electrode 320 are arranged inside the jaws 211, 212 of the pressing assembly 200 so as to face each other axially and have a diameter smaller than that of the jaws 211, 212. Each electrode 310 and 320 is insulated both from the other electrode and from the jaws by means of rings 330 made of insulating material (FIG. 6) and, as shown in FIG. 5, the electrodes 310 and 320 also form elements for pressing in the radial direction the strips 1 during winding. The electrodes 310 and 320 are energized by an energizing assembly including (FIG. 7) a cover 340 with two internally fixed conducting rings 342$a$ and 342$b$ which are energized by means of respective conducting pins 343$a$, 343$b$. The respective conducting pins 343$a$ and 343$b$ are also fixed and connected to an external power supply. Conducting discs are axially pushed by springs 344 against contact brushes 345, which in turn make contact axially with the electrodes 310 and 320 in the longitudinal direction X-X.

With the configuration described above the pressing assembly 200 and welding assembly 300 are prepared with the jaws 211 and 212 axially spaced in the longitudinal direction X-X by an amount corresponding to the width of the strips 1 to be wound. In particular, since the graphite strip 1$b$ is normally wider than the steel strip 1$a$ the distance between the two jaws 211, 212 is preferably greater than the width of the steel strip 1$a$ of smaller width and less than the width of the graphite strip 1$b$ of greater width. The electrodes 310 and 320 can be arranged coaxially inside the jaws 211 and 212. The support ring 113 can be mounted on the mandrel 111 so that its circumferential edge is radially inserted between the jaws 211 and 212 and axially centred with respect to the jaws 211 and 212. The support ring 113 can lock in position by means of the spacers 114$a$ and the nut 112$b$.

The strip 1$a$ with optimum mechanical properties feds to the support ring 113, and inserts between the two jaws 211 and 212. Upon completion of the first turn of the strip 1$a$, initial welding of the steel strip 1$a$ itself is performed to form the inner ring of the seal. The electrodes 310, 320 that in addition to exerting pressure in the radial direction Y-Y, are also energized simultaneously to perform welding, perform the welding operation. Winding of the strips 1$a$ and 1$b$ continues until the programmed diameter is reached. During winding, the planarity of the seal in the axial direction X-X is ensured by the jaws 211 and 212 retaining the strips in the longitudinal direction X-X. The jaws 211 and 212 also determine the width of the finished seal in the axial direction X-X following the compression. The compactness of the seal is ensured by a pushing force in the radial direction of the pressing assembly 200, which is recalled towards the support ring by an action of a pneumatic cylinder (not shown), producing a thrust in the radial direction by the electrodes 310, 320 which, during winding, are not energized.

Once the apparatus reaches the desired seal diameter, winding of the strip 1$b$ stops and, in a zone where two sections of the strip 1$a$ are superimposed, final welding is performed to close the spiral. Energizing the discs 342$a$, 342$b$ which in turn energize the contact brushes 345$a$, 345$b$ which make contact with the electrodes 310, 320 which, emitting an impulse, perform welding while keeping at the same time the seal compressed in the radial direction. The cylinder recalling the pressing assembly 300 operates to free the seal from the axial volume of the jaws 211 and 212 such that a finished seal may be unloaded and the apparatus reset to perform winding of the next seal.

It is therefore clear how, with the apparatus according to the invention, it is possible to achieve welds of seals that are of better quality. The welding being performed by the electrodes 310, 320 that also form the elements with a pressing surface, which keeps the strips 1 well compacted in the radial direction. In addition, retention of the strips 1 inside the jaws 211, 212 during winding prevents any deviation of the strips in the transverse direction, thus ensuring an improved planarity of the finished seal, which increases its characteristics, also helping improve the quality of the final weld.

According to the invention, it is also envisaged that the apparatus may be mounted on machines (not shown) for spirally winding seals whether they be of the manual, semi-manual or automatic type. Programming devices schematically indicated by 500 in FIG. 1 can control the various operations and working sequences.

In connection with winding machines, there is also a reduction in the overall dimensions of these machines, since the welding assembly 200 is no longer situated at a distance from the pressing assembly 300 but is combined with the pressing assembly itself.

Although described in connection with certain constructional forms and certain preferred examples of embodiment of the invention, it is understood that the apparatus may be used also in sectors different from the seal-forming sector and that the scope of protection of the present patent is defined solely by the following claims.

What is claimed is:

1. An apparatus for welding strips with different mechanical properties wound on a support ring, the apparatus comprising:
   an assembly for winding the strips;
   a pressing assembly for applying radial pressure onto the strips, comprising a first circular jaw and a second circular jaw arranged opposite each other and spaced in the longitudinal direction by an amount corresponding to the width of a finished seal; and
   a welding assembly for welding one of the strips, the welding assembly coaxial with the pressing assembly, the welding assembly comprising
   an energization assembly, springs, a first electrode and a second electrode, the first electrode and the second electrode arranged inside the jaws of the pressing assembly so as to face each other and have a diameter smaller than that of the jaws, each electrode being electrically insulated both from the other electrode and from the jaws by means of rings made of electrically insulating material and the electrodes act simultaneously with pressure in the radial direction on the strips;

wherein the energization assembly includes a cover that houses the springs and two fixed conducting rings energized by means of respective conducting pins fixed and connected to an external electric power source, the springs providing an axial thrust in the longitudinal direction against contact brushes that make contact with the electrodes.

2. The apparatus of claim 1, wherein the first jaw is axially fixed to the body of the apparatus, while the second jaw is displaced in the longitudinal direction relative to the first jaw.

3. The apparatus of claim 1, wherein the pressing assembly comprises: means for pushing the assembly in the vertical direction and means for moving the pressing assembly in the opposite direction to the pushing direction.

4. The apparatus of claim 3, wherein the pushing direction is towards the strips being wound.

5. The apparatus of claim 1, wherein the winding assembly comprises: a mandrel which rotates about the longitudinal axis, a pin inserted inside the mandrel for supporting the support ring for the seal locked in position in the longitudinal direction.

6. The apparatus of claim 5, wherein during winding, the support ring is arranged with its circumferential edge radially inserted between the jaws and axially centered with respect thereto.

7. The apparatus of claim 1, wherein the strips have a different width in the axial direction.

8. The apparatus of claim 7, wherein the first circular jaw and the second circular jaw arranged opposite each other are spaced in the longitudinal direction by an amount greater than the width of the strip of smaller width and less than the width of the strip of greater width.

* * * * *